United States Patent
Alkalay et al.

(10) Patent No.: US 12,154,203 B2
(45) Date of Patent: Nov. 26, 2024

(54) GENERATING CUSTOMIZED CONTEXT-SPECIFIC VISUAL ARTIFACTS USING ARTIFICIAL INTELLIGENCE

(71) Applicant: FMR LLC, Boston, MA (US)

(72) Inventors: Yael Alkalay, Brookline, MA (US); Kalyan Prakash Katika, Cary, NC (US); John C. McDonough, Nahant, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/496,544

(22) Filed: Oct. 27, 2023

(65) Prior Publication Data

US 2024/0144565 A1 May 2, 2024

Related U.S. Application Data

(60) Provisional application No. 63/420,534, filed on Oct. 29, 2022.

(51) Int. Cl.
  *G06T 11/60* (2006.01)
  *G06N 3/04* (2023.01)
  *G06N 20/00* (2019.01)

(52) U.S. Cl.
  CPC ............. *G06T 11/60* (2013.01); *G06N 3/04* (2013.01); *G06N 20/00* (2019.01)

(58) Field of Classification Search
  CPC .......... G06T 11/60; G06N 20/00; G06N 3/04
  See application file for complete search history.

(56) References Cited

U.S. PATENT DOCUMENTS

| | | | | |
|---|---|---|---|---|
| 8,566,353 | B2 * | 10/2013 | Fink | H04N 21/454 |
| | | | | 707/782 |
| 10,943,072 | B1 * | 3/2021 | Jaganmohan | G06N 5/041 |
| 2010/0245532 | A1 * | 9/2010 | Kurtz | G06V 20/40 |
| | | | | 348/14.03 |
| 2013/0238778 | A1 * | 9/2013 | Reitan | H04L 41/00 |
| | | | | 709/223 |
| 2019/0050928 | A1 * | 2/2019 | Tedesco | G06Q 30/06 |
| 2019/0197590 | A1 * | 6/2019 | Borchetta | H04L 67/53 |
| 2020/0368616 | A1 * | 11/2020 | Delamont | H04N 13/239 |

(Continued)

OTHER PUBLICATIONS

A. Radford et al., "Improving Language Understanding by Generative Pre-Training," OpenAI, published Jun. 11, 2018, available at https://cdn.openai.com/research-covers/language-unsupervised/language_understanding_paper.pdf, 12 pages.

(Continued)

*Primary Examiner* — YuJang Tswei
(74) *Attorney, Agent, or Firm* — Cesari and McKenna, LLP

(57) ABSTRACT

Methods and apparatuses are described for generating customized, context-specific visual artifacts using artificial intelligence (AI). A server computing device captures input data from one or more remote computing devices, the input data associated with one or more users. The server computing device creates one or more visual artifacts based upon the input data, each of the one or more visual artifacts associated with one or more of the users. The server computing device integrates the visual artifacts into a communication session associated with the remote computing devices.

28 Claims, 6 Drawing Sheets

(56) References Cited

U.S. PATENT DOCUMENTS

| | | | | |
|---|---|---|---|---|
| 2021/0185276 | A1* | 6/2021 | Peters | G06V 20/41 |
| 2021/0357380 | A1* | 11/2021 | Morad | H04L 51/04 |
| 2022/0405630 | A1* | 12/2022 | Harrison | G06Q 10/0639 |
| 2023/0162379 | A1* | 5/2023 | Varekamp | G06T 7/30 |
| | | | | 382/159 |

OTHER PUBLICATIONS

T. B. Brown et al., "Language Models are Few-Shot Learners," arXiv:2005.14165v4 [cs.CL] Jul. 22, 2020, available at https://arxiv.org/pdf/2005. 14165.pdf, 75 pages.

L. Weng, "What are Diffusion Models?," Lil'Log blog, published Jul. 11, 2021, available at https://lilianweng.github.io/posts/2021-07-11-diffusion-models/, 19 pages.

A. Ramesh et al., "Hierarchical Text-Conditional Image Generation with CLIP Latents," arXiv:2204.06125v1 [cs.CV] Apr. 13, 2022, available at https://arxiv.org/pdf/2204.06125.pdf, 27 pages.

S. Patil et al., "Stable Diffusion with Diffusers," Hugging Face blog, published Aug. 22, 2022, available at https://huggingface.co/blog/stable_diffusion, 22 pages.

C. Saharia et al., "Photorealistic Text-to-Image Diffusion Models with Deep Language Understanding," arXiv:2205.11487v1 [cs.CV] May 23, 2022, available at https://arxiv.org/pdf/2205.11487.pdf, 46 pages.

* cited by examiner

GENERATING CUSTOMIZED CONTEXT-SPECIFIC VISUAL ARTIFACTS USING ARTIFICIAL INTELLIGENCE

RELATED APPLICATION(S)

This application claims priority to U.S. Provisional Patent Application No. 63/420,534, filed Oct. 29, 2022, the entirety of which is incorporated herein by reference.

TECHNICAL FIELD

This application relates generally to methods and apparatuses, including computer program products, for generating customized, context-specific visual artifacts using artificial intelligence.

BACKGROUND

In the aftermath of the worldwide COVID-19 pandemic, work and workplace dynamics have changed dramatically. Nowadays, working remotely and connecting with co-workers virtually using computing technology is a widespread practice across industries, communities, and locations. This affects the way we work, and particularly the way we work in teams. Most often, remote team members congregate online using a video conferencing platform to participate in meetings, share ideas, and communicate with other members of the team.

Working from home and related team interactions through such online means introduces new challenges. One of the key challenges is how best to foster team member engagement and inclusive culture when we are no longer in face-to-face contact with co-workers on a regular basis. It has been observed that remote workers can be highly productive but may be hard to retain and less effective at their job due to the lack of engagement with others. Working in this type of isolation also has an emotional impact; loneliness can harm the physical, emotional, and mental health of remote employees. Developing work friendships through greater engagement can make people happier and lead them to put in greater effort toward their job. In addition, happy teams are generally more productive and have less turnover, which is one of the biggest costs to a company.

SUMMARY

Therefore, what is needed are computerized methods and systems that improve the engagement, integration, and inclusiveness of a remote workforce through the generation of customized visual artifacts based upon context-specific inputs captured from one or more users. The techniques described herein advantageously provide for automatic creation of visual artifacts (e.g., images, video streams) generated by leveraging advanced artificial intelligence (AI)-based techniques on an input data set that can comprise persistent attributes and transitory attributes. These visual artifacts can then be introduced to a variety of software applications used by the remote workforce to help foster greater connectivity, collaboration, and team cohesiveness. For example, virtual workplace interactions such as team meetings and video conferences, employee onboarding, interviews, webinars, customer outreach, and others can all benefit from the visual artifact generation methods and systems described herein. In addition, the system collects and stores input data used to generate the visual artifacts, output data (i.e., visual artifacts), and user feedback data in a centralized database in order to continually iterate on the visual artifact generation process, identify trends in the community, and streamline future creation of visual artifacts for a given user set based upon prior inputs and activity.

The invention described herein provides a myriad of benefits, including but not limited to:

Creating a data store that records current and previous input data to create suggested or enhanced visual artifacts that enable a user to develop such artifacts in "auto" mode—including elements such as dynamic changes based on the current time of a virtual meeting (for example, at sundown or sunrise), indicia relating to the user's mood or health based upon data (e.g., captures number of steps that day) extracted from a user's wearable device, or other customized features. Input data can also include a variety of other data elements, e.g., {remote meeting number of participants, names, roles) combined with spoken inputs{topic(s) that are discussed, themes, ideas, timelines), artifacts that being presented {slides, wires, charts, data visualizations} and online meeting interactive inputs {chat text, emoji, polls}—create an evolving and changing algorithmic output of ideas and online interaction.

Generating improvements to Diversity, Equity, and Inclusion (DEI) initiatives, such as custom dynamic backgrounds or videos for virtual meeting attendees; custom visual artifacts for a host of a webinar (e.g., combining or analyzing the input data of all webinar attendees dynamically and using those common inputs to create a background image, video or flowing video that changes during the meeting);

Using created visual artifacts as inputs into a larger enterprise repository to capture trends of an associate community in order to generate tailored automated messaging, top ten list of images or inputs and other vectors.

The invention, in one aspect, features a computer system for generating customized, context-specific visual artifacts using artificial intelligence. The system includes a computing device having a memory that stores computer-executable instructions and a processor that executes the computer-executable instructions. The computing device captures input data from one or more remote computing devices, the input data associated with one or more users. The computing device creates, using an AI-based visual artifact generator, one or more visual artifacts based upon the input data, each of the one or more visual artifacts associated with one or more of the users. The computing device integrates the visual artifacts into a communication session associated with the one or more remote computing devices.

The invention, in another aspect, features a computerized method of generating customized, context-specific visual artifacts using artificial intelligence. A computing device captures input data from one or more remote computing devices, the input data associated with one or more users. The computing device creates, using an AI-based visual artifact generator, one or more visual artifacts based upon the input data, each of the one or more visual artifacts associated with one or more of the users. The computing device integrates the visual artifacts into a communication session associated with the one or more remote computing devices.

Any of the above aspects include one or more of the following features. In some embodiments, the input data comprises one or more of: text data input by the user, user demographic data, user profile data, user account data, health data, activity data, social media data, location data, employment profile data, diversity and inclusion data, timestamp data, user preferences, hardware/software attributes associated with the remote computing device, video data captured from the remote computing device, audio data captured from the remote computing device, and characteristics of the communication session. In some embodiments, at least a portion of the input data is captured from the remote computing devices while the communication session is ongoing between the one or more remote computing devices. In some embodiments, the computing device analyzes the video data from the remote computing device to generate additional input data that comprises one or more attributes associated with a user depicted in the video data or a physical object depicted in the video data. In some embodiments, the computing device analyzes the audio data from the remote computing device to generate additional input data comprising one or more attributes of a user's voice captured in the audio data.

In some embodiments, the computing device converts the input data into a format for ingestion by the AI-based visual artifact generator. In some embodiments, converting the input data into a format for ingestion by the AI-based visual artifact generator comprises determining a label associated with the input data and assigning the label to the input data.

In some embodiments, the visual artifacts are representative of one or more characteristics of the input data. In some embodiments, the visual artifacts comprise synthetic images depicting one or more characteristics of the input data. In some embodiments, the AI-based visual artifact generator comprises one or more of a generative adversarial network, a variational autoencoder, or an autoregressive model.

In some embodiments, the communication session comprises a video conferencing session. In some embodiments, integrating the visual artifacts into the communication session comprises inserting the visual artifact associated with a user into a virtual background of a video feed depicting the user. In some embodiments, integrating the visual artifacts into a communication session associated with the one or more remote computing devices comprises: combining the visual artifacts for a plurality of users into an aggregate visual artifact; and displaying the aggregate visual artifact to the users during the communication session.

In some embodiments, the computing device receives feedback relating to the visual artifacts from one or more remote computing devices and modifies the input data based upon the feedback prior to creating additional visual artifacts using the AI-based visual artifact generator. In some embodiments, the computing device dynamically changes the visual artifacts during the communication session using the AI-based visual artifact generator based upon one or more updates to the input data captured during the communication session.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
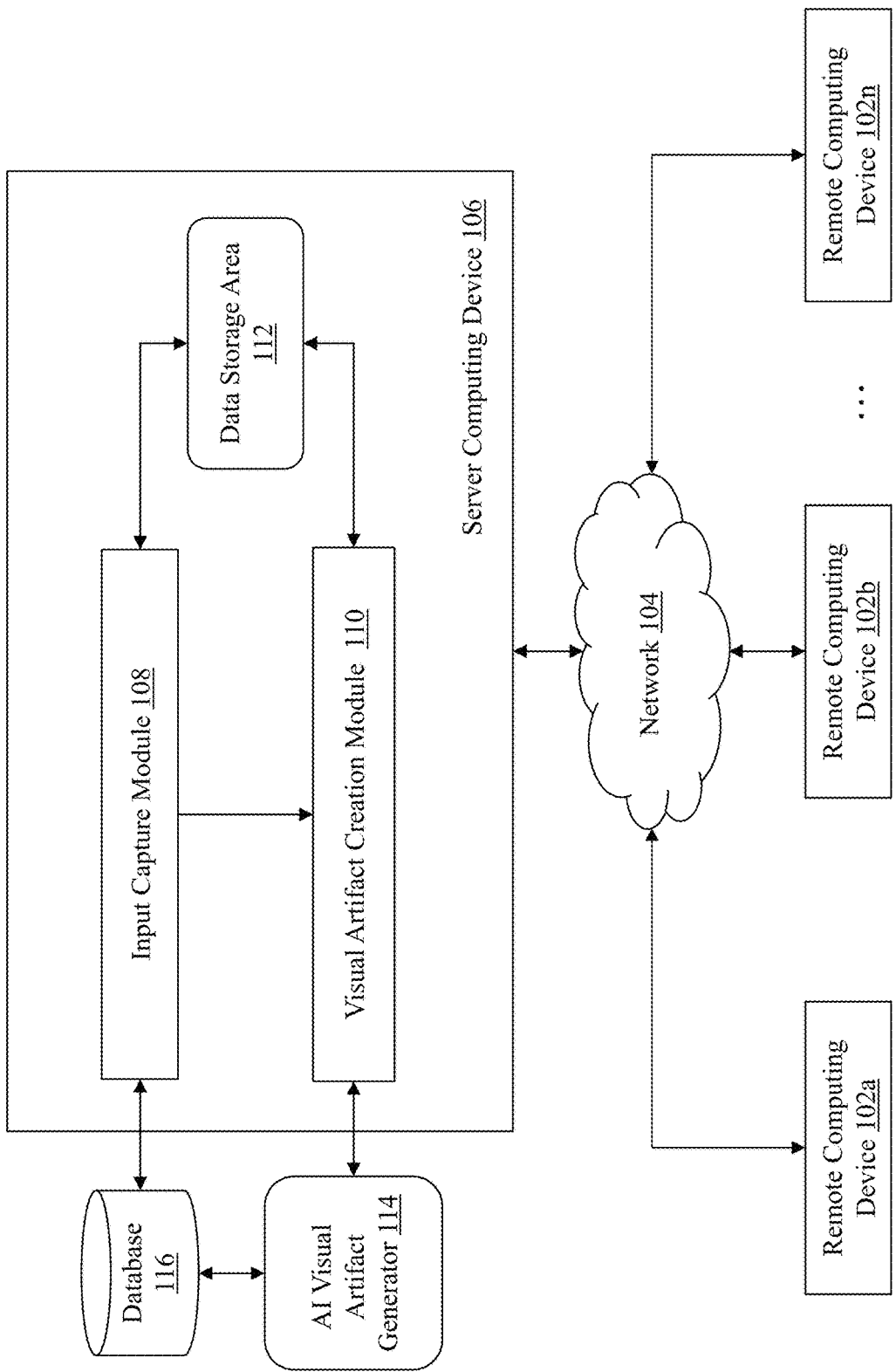
FIG. 1 is a block diagram of a system for generating customized, context-specific visual artifacts using artificial intelligence (AI).

FIG. 1 is a block diagram of a system 100 for generating customized, context-specific visual artifacts using artificial intelligence (AI). The system 100 includes a plurality of remote computing devices 102a-102n, a communications network 104, a server computing device 106 that includes an input capture module 108, a visual artifact creation module 110, and a data storage area 112, and an AI visual artifact generator 114.

The remote computing devices 102a-102n each connect to one or more communications networks (e.g., network 104) in order to communicate with the server computing device 106 to provide input and receive output relating to generating customized, context-specific visual artifacts using AI as described herein. Exemplary remote computing devices 102a-102n include but are not limited to server computing devices, desktop computers, laptop computers, tablets, mobile devices, smartphones, wearables, and the like. It should be appreciated that other types of computing devices that are capable of connecting to the components of the system 100 can be used without departing from the scope of invention. It should be appreciated that the system 100 can include any number of remote computing devices.

The communications network 104 enables the remote computing devices 102a-102n to communicate with the server computing device 106. The network 104 is typically comprised of one or more wide area networks, such as the Internet and/or a cellular network, and/or local area networks. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for generating customized, context-specific visual artifacts using AI as described herein. The server computing device 106 includes an input capture module 108 and a visual artifact creation module 110 that execute on one or more processor(s) of the server computing device 106. In some embodiments, the modules 108, 110 are specialized sets of computer software instructions programmed onto one or more dedicated processors in the computing device. In some embodiments, module 108, 110 can be configured to execute processing based on, e.g., Generative Pre-trained Transformer (GPT) frameworks (as described in A. Radford et al., "Improving Language Understanding by Generative Pre-training," OpenAI, published Jun. 11, 2018, available at cdn.openai.com/research-covers/language-unsupervised/language_understanding_paper.pdf, which is incorporated herein by reference). An exemplary GPT framework is GPT-3 (github.com/openai/gpt-3), also described in T. B. Brown et al., "Language Models are Few-Shot Learners," arXiv:2005.14165 [cs.CL], 22 Jul. 2020, available at arxiv.org/pdf/2005.14165.pdf, which is incorporated herein by reference.

In some embodiments, the server computing device 106 is part of a computing system for establishing and managing communication sessions between a plurality of the remote computing devices 102a-102n. For example, the server computing device 106 can be included in a video conferencing system or web-based virtual meeting platform (e.g., Zoom™, WebEx™, Teams™). The server computing device 106 can be configured with hardware and/or software modules which manage the communication sessions between the remote computing devices, in addition to modules 108, 110 which implement functions for generating customized, context-specific visual artifacts using AI as described herein.

Although the modules 108, 110 are shown in FIG. 1 as executing within the same server computing device 106, in some embodiments the functionality of the modules 108, 110 can be distributed among one or a plurality of other computing devices that are coupled to the server computing device 106. As shown in FIG. 1, the server computing device 106 enables the modules 108, 110 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The functionality of the modules 108, 110 will be described in greater detail throughout this specification.

The data storage area 114 is a memory location resident on the server computing device 106 (or in some embodiments, one or more other computing devices). The data storage area 114 is configured to receive, generate, and store specific segments of data—including but not limited to input data and output visual artifacts—relating to the process of generating customized, context-specific visual artifacts using AI as described herein.

The AI visual artifact generator 114 is a computing device or computing service (e.g., cloud-based or SaaS-based service) coupled to the server computing device 106 that dynamically generates visual artifacts (e.g., images, video, image streams, and the like) in response to input data, using one or more advanced AI techniques or platforms. In some embodiments, the AI visual artifact generator 114 is connected to the server computing device 106 via an application programming interface (API), where server 106 issues one or more API calls to generator 114 and receives data from generator 114 that is responsive to the API calls. In other embodiments, the AI visual artifact generator 114 can be incorporated into the server computing device 106 as a separate software module. The AI visual artifact generator 114 can comprise one or more proprietary or open-source AI algorithms that receives input (e.g., in the form of structured or unstructured text descriptions) and generates one or more corresponding original virtual artifacts based upon the input. For example, when provided the text phrase 'A dog driving a red car at night,' the AI visual artifact generator 114 can generate and return one or more visual artifacts that represent the elements contained in the text phrase. Exemplary AI visual artifact generators 114 can include, but are not limited to, DALL•E 2 from OpenAI, Inc.; Imagen from Google, Inc.; Stable Diffusion available at stablediffusionweb.com; Midjourney available at midjourney.com; and others.

In some embodiments, AI visual artifact generator 114 is coupled to one or more data repositories (e.g., database 116) for storage and retrieval of user-specific input data, and/or collective input data for a set of users, which enables system 100 to continuously learn from captured input data over time in order to improve the visual artifact generation for individual users as well as the overall userbase. Database 116 is deployed on a single computing device (or in some embodiments, on a plurality of computing devices) coupled to AI visual artifact generator 114 and/or to input capture module 108 of server computing device 106. Database 116 is configured to receive, generate, transmit, and store specific segments of data relating to the process of generating customized, context-specific visual artifacts using AI as described herein. In some embodiments, all or a portion of database 116 can be integrated with a computing device or devices shared with AI visual artifact generator 114, integrated with server computing device 106, or be located on a separate computing device or devices. Database 116 is configured to store portions of data used by the other components of system 100, as will be described in greater detail below. In some embodiments, database 116 is located in a cloud storage infrastructure comprising one or more nodes accessible by server computing device 106 and/or AI visual artifact generator 114. Specific aspects of the functions performed by database 116, and the data contained therein, are described throughout the specification.

Figure 2:
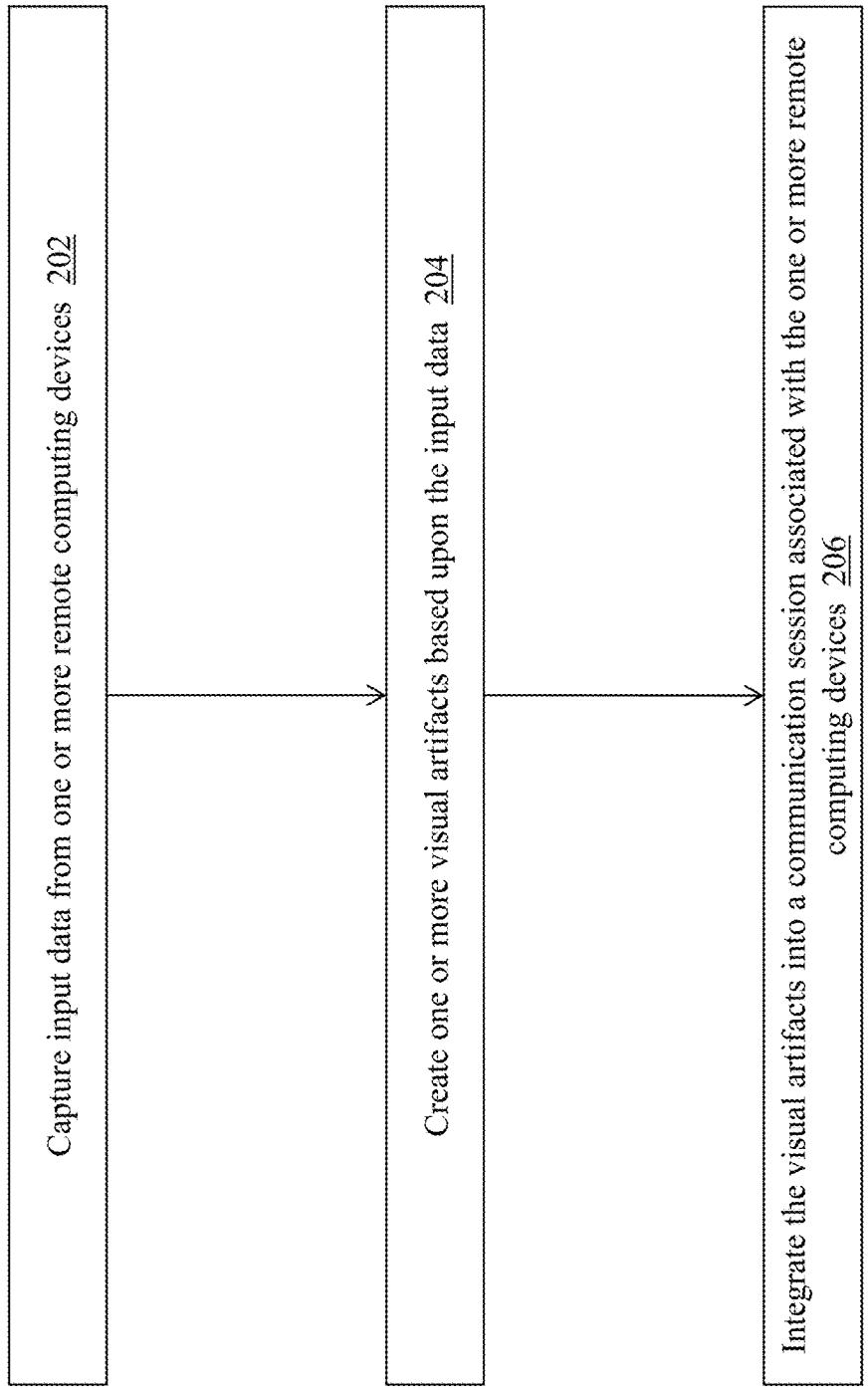
FIG. 2 is a flow diagram of a computerized method of generating customized, context-specific visual artifacts using AI.

FIG. 2 is a flow diagram of a computerized method 200 of generating customized, context-specific visual artifacts using AI, using the system 100 of FIG. 1. The input capture module 108 captures (step 202) input data from one or more remote computing devices 102a-102n. In some embodiments, a plurality of the remote computing devices 102a-102n are associated with a single user (e.g., a mobile device, a desktop computer, and a smart wearable device). Generally, the input data comprises any of a variety of different data elements that relate to or are otherwise associated with a particular user. The input data can be persistent (e.g., stored in data storage area 112 for future reference and uses) and/or transitory (e.g., pertaining to a single user session or interaction). Example input data includes but is not limited to: user demographics and other user identifying information; user account information; device-related data, health/activity data (e.g., steps, workout metrics); employment profile data; social media data; location/GPS data; user preference data; diversity, equity, and inclusion data; and other types of data. In some embodiments, the input capture module 108 captures user-related data associated with a particular communication event or communication session (such as a video conference or meeting)—including but not limited to video camera feed and/or images from a user's video camera, spoken audio, time of day, name, text/chat inputs, presented documents, online polls, and emojis. It should be appreciated that other types of input data can be collected by module 108 for use in generating visual artifacts as described herein.

Also, in certain embodiments, the input data can comprise input data from a plurality of different users, not merely a single user. For example, several users may connect to a virtual meeting (e.g., Zoom™, WebEx™, Teams™) via their own remote computing devices 102a-102n. When a user joins the meeting, input capture module 108 can collect information about the user and/or the user's device for inclusion in the input data. During the meeting, each user participates in the discussion and input capture module 108 records the spoken utterances from each user and converts the utterances for use in the input data. As such, the system 100 can be configured to generate one or more visual artifacts that represent the collective input data from all users or from a portion of the users—instead of, or in addition to, visual artifacts that represent input data from a single user.

In some embodiments, module 108 converts one or more of the data elements in the input data prior to transmitting the data elements to visual artifact creation module 110. As an example, module 108 can convert spoken audio from a user into a text string (e.g., using a speech-to-text algorithm). In another example, module 108 can convert data from a wearable device (such as workout statistics) into a format that can be used by module 110 and/or AI visual artifact generator 114 to generate a visual artifact—a user may have run a half-marathon the previous day as recorded in the user's smartwatch, and module 108 can capture the workout data, determine that the data corresponds to a long period of exercise, and assign a label to the input data (e.g., 'tired'). Module 108 then transmits the labelled input data to module 110 for generation of the visual artifact, and module 110 can incorporate the label into the API call to the visual artifact generator 114.

Input capture module 108 transmits the input data to visual artifact creation module 110, and module 110 creates (step 204) one or more visual artifacts based upon the input data. As described above, module 110 connects to AI visual artifact generator 114 (e.g., via API) and provides one or more data elements from the input data set to generator 114. Generator 114 uses the input data elements to dynamically generate, using advanced AI techniques, one or more visual artifacts that are representative of or otherwise related to the input data set. Exemplary artifact generation techniques can include, but are not limited to, the use of generative models (Generative Adversarial Networks (GANs), Variational Autoencoders (VAEs), and autoregressive models like PixelRNN). In some embodiments, visual artifact creation module 110 can analyze the input data and generate additional input data for use in creating the visual artifacts. As one example, module 110 can analyze the incoming video feed from a user's webcam at their remote computing device 102a-102n and determine one or more characteristics of the user (e.g., physical features, mood), and/or the user's background (e.g., objects, pets, lighting, weather) that may be used as input data. Similarly, module 110 can analyze an incoming audio feed from the user's remote computing device 102a-102n and determine one or more characteristics of the user (e.g., emotion, speaking style, accent, foreign language) that may be used as input data.

It should be appreciated that, in some embodiments, input capture module 108 and visual artifact creation module 110 can be configured to capture input data from a plurality of remote computing devices 102a-102n and provide the input data to one or more AI visual artifact generators 114 for the creation of an adaptive, changing visual artifact. For example, during a virtual communication session, input capture module 108 periodically or continuously captures input data from the remote computing devices 102a-102n and/or data storage area 112 and provides the input data via module 110 to generator 114 for the creation of a visual artifact, which is then returned to server computing device 106. In some embodiments, after a first visual artifact is created, subsequently captured input data can be used to adapt, modify, or update the first visual artifact to generate a new visual artifact. For example, the first visual artifact may represent input data associated with a first user who joined the virtual meeting. When a second user joins the virtual meeting, the visual artifact creation module 110 can provide the second user's input data to AI visual artifact generator 114, which generates a new visual artifact that incorporates elements from the input data of both the first user and the second user. In some embodiments, the output from AI visual artifact generator 114 can be a visual artifact (e.g., image) that is downloaded to remote computing device 102a-102n, delivered via API directly into video conferencing platform software (e.g., as a background for the user), and/or automatically update a wearable device to display the visual artifact.

Figure 3:
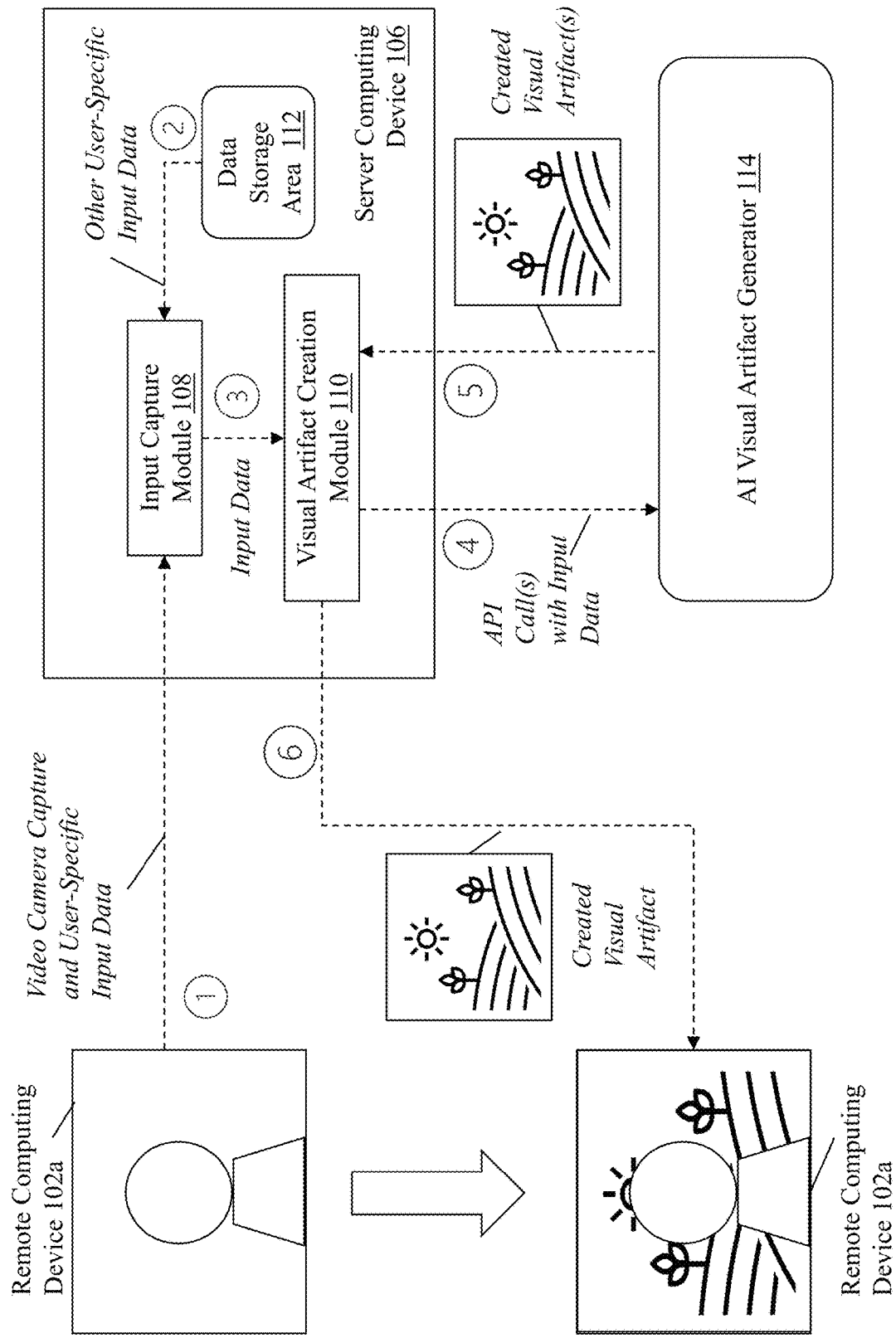
FIG. 3 is a flow diagram of an exemplary workflow for integration of a visual artifact into a video communication session.

Once the AI visual artifact generator 114 generates one or more visual artifacts, the generator 114 transmits the visual artifacts to visual artifact creation module 110. Module 110 then integrates (step 206) the visual artifacts into a communication session associated with the plurality of remote computing devices 102a-102n. It should be appreciated that the integration step can comprise any of a variety of different applications of the visual artifacts into the communication session. As just one example, during a virtual meeting, visual artifact creation module 110 can insert a visual artifact created for a specific user into the virtual background of that user's video camera feed—thereby producing a personalized, user-specific background for the user that others in the virtual meeting can see. FIG. 3 is a flow diagram of an exemplary workflow for integration of a visual artifact into a video communication session. At step 1, input capture module 108 of server computing device 106 receives a video feed of a user (via a webcam) from the user's remote computing device 102a. Module also receives other user-specific input data from the remote computing device 102a (e.g., wearable data, user device data, demographic data, etc.). At step 2 (optional), input capture module 108 retrieves other user-specific input data from, e.g., data storage area 112—such as user profile data, historical user interaction data, historical visual artifact data, and the like.

At step 3, input capture module 108 provides the collected input data (including the video camera feed) to visual artifact creation module 110. As mentioned above, module 110 can in some embodiments analyze the input data to generate one or more additional input data elements, update existing input data elements, and/or remove certain input data elements prior to transmitting an input data set to generator 114. At step 4, module 110 initiates one or more API calls, with the input data as payload, to AI visual artifact generator 114 for creation of corresponding visual artifact (s). At step 5, generator 114 transmits the created visual artifact(s) back to module 110. At step 6, module 110 transmits the created visual artifact(s) to remote computing device 102a, where the artifact(s) are integrated into the communication session—in this example, an image artifact is inserted as a virtual background into the user's virtual meeting video feed. It should be appreciated that, in some embodiments, visual artifact creation module 110 can perform the integration of the visual artifact(s) into the communication session—such as layering a visual artifact into the user's video camera feed and transmitting the updated video camera feed to all participants in the communication session.

Figure 4:
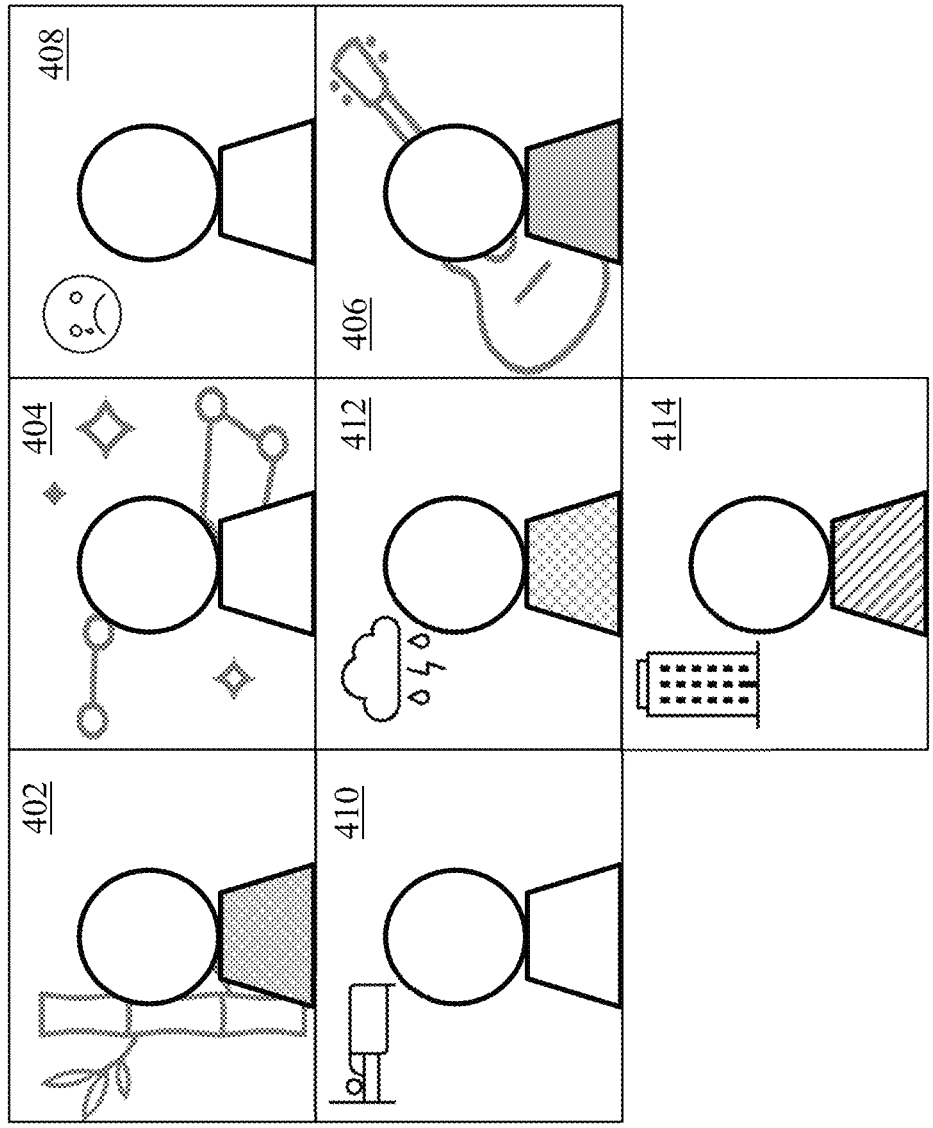
FIG. 4 is a diagram of an exemplary user interface for a virtual meeting comprising a plurality of participants, where the system has created a unique visual artifact for each participant.

As can be appreciated, the system 100 can be configured to dynamically create customized visual artifacts for each participant in a communication session based upon each user's individual input data. FIG. 4 is a diagram of an exemplary user interface 400 for a virtual meeting comprising a plurality of participants, where the system 100 has created a unique visual artifact for each participant. As shown in FIG. 4, the visual artifact for users 402, 404 and 406 comprise a virtual background—e.g., the input data for user 406 included one of the user's hobbies is guitar playing, so the virtual artifact created for that user is an image of a guitar. The visual artifact for user 408 is a sad emoji—indicating that the system 100 determined the user is feeling sad (through input solicited from the user and/or through analysis of the user's video and/or audio feed). Similarly, the system 100 determined through sleep tracking data from a wearable device that user 410 did not get much sleep last night, so the user's visual artifact is a sleeping person—indicating to others in the meeting that the user 410 is tired. The visual artifact for users 412 and 414 relate to the location of the users as determined by the system 100 (e.g., through GPS/location from the user's device, weather data, IP address, device name, etc. and/or through solicitation from the user). For example, a thunderstorm is currently passing through user 412's location, so the system 100 generates a thundercloud icon in the user's video feed. Similarly, user 414 is participating in the video meeting from her office computer, so the system 100 generates an office building icon for display in her video feed.

Figure 5:
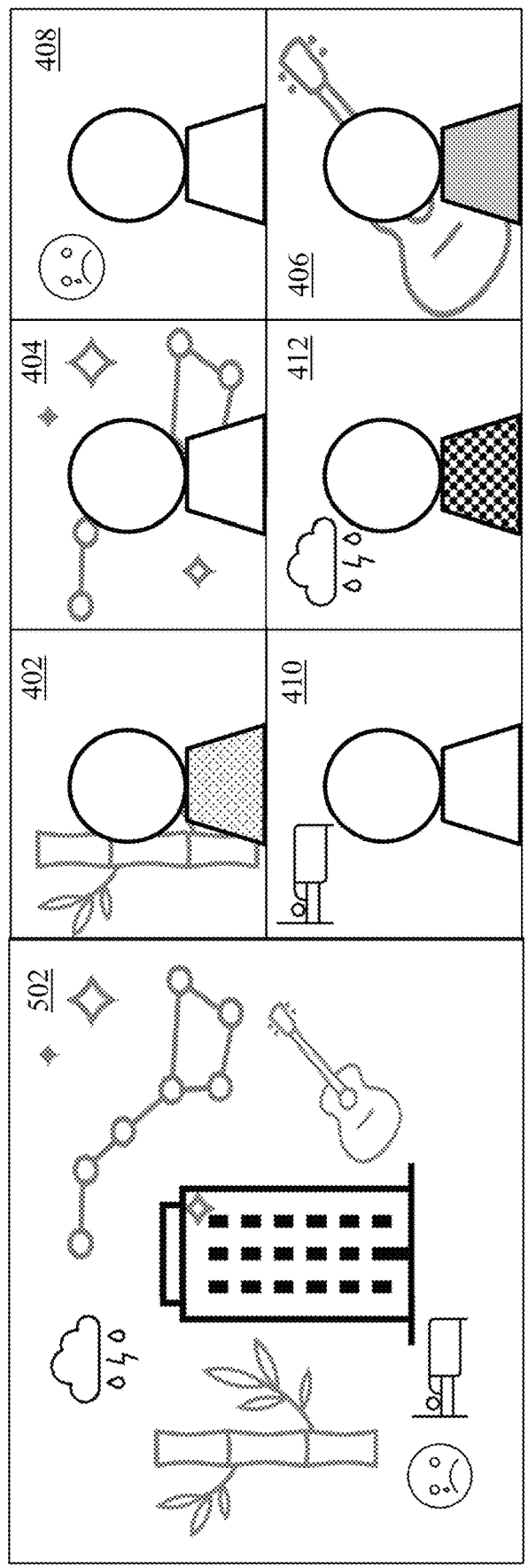
FIG. 5 is a diagram of an exemplary user interface for a virtual meeting comprising a plurality of participants, where the system has created a unique shared visual artifact of the meeting and participants' output of ideas and interactions.

FIG. 5 is a diagram of an exemplary user interface 500 for a virtual meeting comprising a plurality of participants, where the system 100 has created a unique shared visual artifact of the meeting and participants' output of ideas and interactions. As shown in FIG. 5, the shared visual artifact 502 combines the generated visual artifacts for all of the users 402-412 (as shown previously in FIG. 4) together in a single artifact. Advantageously, this provides for a shared visual artifact that is reflective of interactions between the users in the meeting and/or a summary of ideas expressed or exchanged during the meeting. As can be appreciated, the shared visual artifact can be saved and stored in, e.g., data storage area 112 and/or database 116, representing an archive of the meeting discussion and interaction.

In addition to the generation of visual artifacts, the input data collected by the system 100 can be used to improve grouping and matching of users in communication sessions. As one example, a user at a first remote computing device 102a may provide input data with one or more characteristics or features that is similar to, or overlap with, one or more characteristics or features of another user at a second remote computing device 102b. The system 100 can leverage the similarity of characteristics to perform one or more actions during a communication session, such as influencing the organization of breakout sessions during a virtual meeting—i.e., assigning people with similar or diverse characteristics and features to the same breakout room or sub-group.

Another important feature of the system 100 is the collection of feedback from users at remote computing devices 102a-102n to improve the subsequent generation of visual artifacts. In one example, visual artifact creation module 110 can generate a visual artifact for a specific user based upon the user's input data. When the visual artifact is presented to the user, the user may be able to provide feedback on the visual artifact (e.g., ratings, comments, like/dislike, etc.). Visual artifact creation module 110 can collect the user feedback and modify the input data in future artifact requests from the user to produce visual artifacts that include or emphasize elements rated highly by the user, and/or not include or deemphasize elements rated poorly by the user. Advantageously, the visual artifacts and associated feedback data are stored in data storage area 112 for reference during later visual artifact generation. Using the stored data of previous inputs from a user, visual artifact creation module 110 can create a better-informed artifact with learned results—i.e., including graded reactions to creations. For example, if a user's input data comprises {Cat+Van Gogh+Sunflowers+Beach}, the module 110 can automatically instruct the AI visual artifact generator to include only black and white cats in visual artifacts instead of multiple cat types because in ten prior artifact requests, the user asked for cat of a specific color nine times.

Other applications of the visual artifact generation techniques described herein include, but are not limited to:

Creating vectors and group scoring and for the purpose of identifying trends in groupings and influencing groupings for better outcomes, and to understand how people organize and use artifacts in order to promote more Diverse, Equitable, and Inclusive situations—using input data such as personal camera captures—[facial recognition, age categorization voice printing]—combined with spoken or typed descriptive request inputs (e.g., {cat+beach+van Gogh+tabby}), the system 100 can create an algorithmic output that defines the current input data for transmission to the AI visual artifact generator 114 in order to influence groupings and locations of users in a meeting.

Creating AI-driven visual representation/avatar of remote participant—using input data such as personal camera captures—[facial recognition, age categorization voice printing]—combined with spoken or typed descriptive request inputs (e.g., {cat+beach+van Gogh+tabby}), the system 100 can create a customized avatar for the remote participant that incorporates features of the input data.

Creating AI-driven visual representation/avatar of virtual assistant—using input data such as date fields, historical interactions with users, demographics, etc., the system 100 can generate a customized avatar that is used as in a virtual assistant communication session (e.g., a chatbot session) with a participant. For example, when a participant is engaged in a communication session with an automated chatbot on July 4 in the United States, the system 100 can generate a avatar for the chatbot that depicts Uncle Sam. For a chatbot session on December 25, the system 100 can generate a Santa Claus avatar. Similarly, certain people may prefer interacting with people just like themselves. In these instances, the system 100 can use input data from prior interactions (e.g., calls, video, etc.) to generate an avatar that has similar characteristics to the participant and/or has characteristics that match a user's preferences.

Creating visual artifacts that summarize brainstorming, panels, feedback and ideation sessions while increasing engagement—using input data such as {number of participants, names, roles} combined with spoken inputs {topics that are discussed during a virtual meeting, themes, ideas, timelines}, documents or other visuals that being presented {slides, wires, charts, data}, and online meeting interactive inputs {chat text, emoji, polls}, the system 100 can create an evolving and changing visual artifact (e.g., collage of images, video stream, changing image, etc.) that contains the substance of the virtual meeting.

Conducting AI-driven chatbot surveys for conversation participants that leverage the generated visual artifacts—another innovative aspect of the methods and systems described herein is the integration of visual artifacts generated by the system 100 into an interactive, AI-driven chatbot survey experience that is presented to participants of a particular communication session. In some embodiments, the server computing device 106 can include a conversation service application (e.g., chatbot) that utilizes one or more natural language processing (NLP) resources to interact with participants at remote computing devices 102a-102n.

Figure 6:
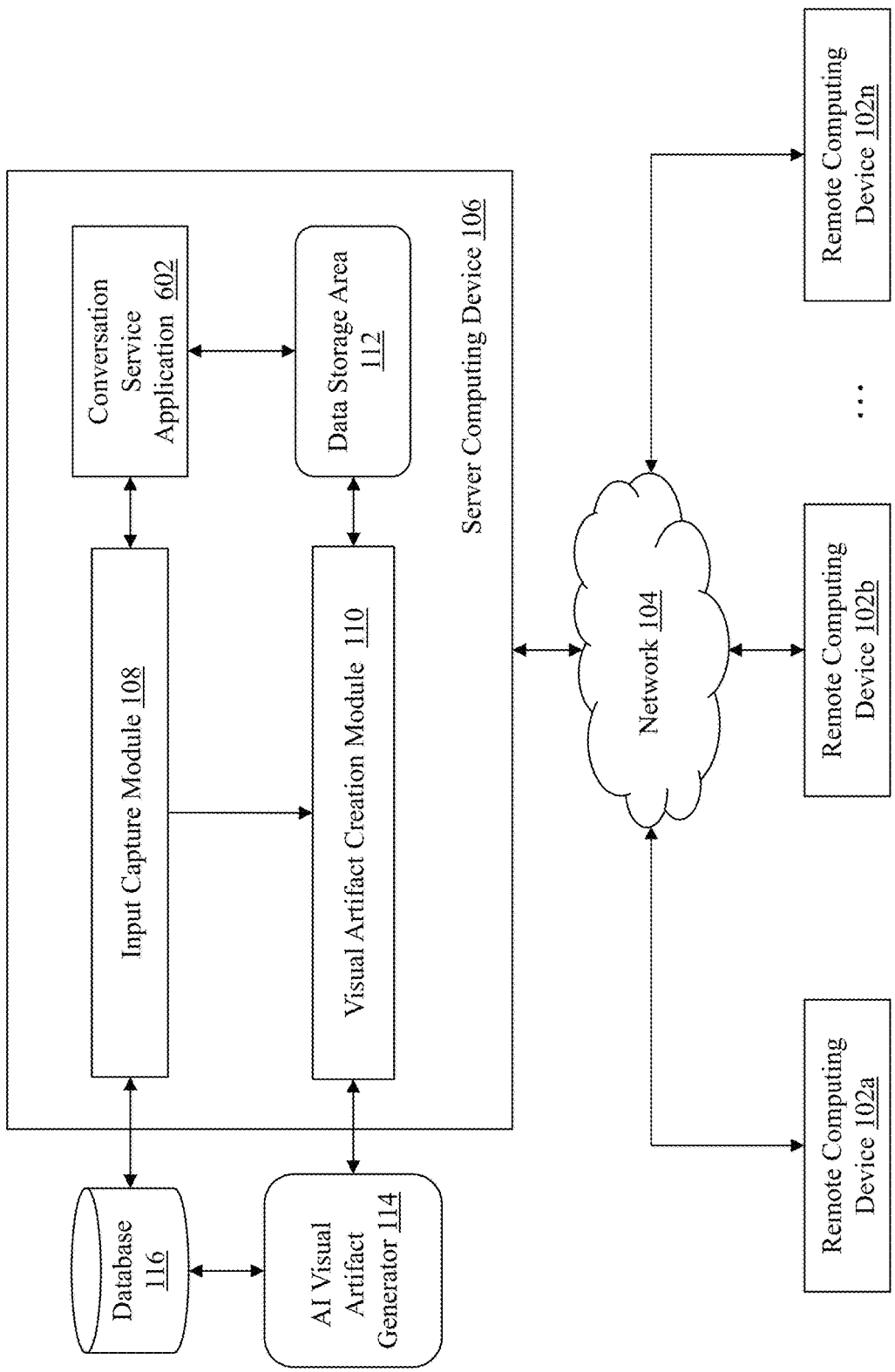
FIG. 6 is a block diagram of a system for generating customized, context-specific visual artifacts used in conjunction with AI-based participant chat sessions.

FIG. 6 is a block diagram of a system 600 for generating customized, context-specific visual artifacts used in conjunction with AI-based participant chat sessions. As can be appreciated, the system 600 includes several components described above with respect to the system 100 of FIG. 1, and those descriptions are not repeated here. The server computing device 106 of FIG. 6 further includes a conversation service software application 602. In some embodiments, the conversation service software application 602 (i.e., virtual assistant (VA), chatbot) is configured to automatically interact with users at remote computing devices 102a-102n in order to conduct a chat-based communication session with the users. An exemplary conversation service software application 602 can utilize a generative machine learning model (e.g., a large language model (LLM) such as ChatGPT™) to create, e.g., survey questions to be displayed in the chat session. In some embodiments, the application 602 can generate an input prompt for the generative model using one or more data elements in the input data captured from users of remote computing devices 102a-102n during the virtual meeting. For example, the application 602 can determine a demographic diversity of the participants using the input data and provide the demographic diversity as part of a prompt to the generative model for creation of a customized survey question and/or questionnaire.

Upon receiving the output from the generative model, the application 602 can display the output to users at remote computing devices 102a-102n and process responses to the survey questions received from the remote computing devices 102a-102n. In some embodiments, the application 602 can execute a natural language processing (NLP) architecture which intelligently parses the responses from remote computing devices 102a-102n to understand, e.g., context of the responses, relationship to one or more themes in the survey question, etc.

As can be appreciated, the conversation service software application 602 can establish a chat-based communication session with the remote computing devices 102a-102n to enable the users at the remote computing devices 102a-102n to participate in an automated chat session with the conversation service software application 602. For example, during an interactive video meeting, the conversation service application 602 can establish a chat session with each participant to, e.g., display one or more survey questions to each participant. In these embodiments, conversation service software application 602 provides the chat interface for the exchange of messages with remote computing devices 102a-102n.

Upon collecting and parsing responses to, e.g., survey questions, the conversation service application 602 can provide the responses (and/or one or more data elements that comprise characteristics of the responses, such as a vectorized representation) to the input capture module 108. Input capture module 108 can analyze the output received from the conversation service application 602 in combination with the visual artifacts generated by visual artifact creation module 110 to identify one or more insights into the participants of the virtual meeting—such as diversity profile, emotion profile, demographic profile, etc. Module 108 can process the identified insights in several different ways, including but not limited to displaying the insights on screen to participants during the virtual meeting and/or using the insights as input to AI visual artifact generator 114 for the creation of additional visual artifacts to be utilized during the meeting.

In some embodiments, the conversation service application 602 is configured to leverage one or more data elements in the input data captured by module 108 to pre-fill or customize survey experiences for the users (e.g., by modifying the prompt(s) used for the generative model and/or prefilling answers to survey questions based upon prior knowledge). For example, if a user at a remote computing device 102a-102n has authenticated to the server computing device 106 via a separate authentication service (e.g., OAuth™, Google™ Auth, or another type of authentication/identification system), the conversation service application 602 can query a computing system associated with the separate authentication service for tokens or other data elements—such as current location, most common location, IP address, etc. The conversation service application 602 can combine these data elements with historical data of the user (e.g., prior survey responses) to pre-fill one or more aspects of the survey and/or a prompt for the generative model 604. For example, a survey may ask the user for their gender and have captured the same response for a certain number of past surveys. Instead of asking the user in subsequent surveys, the application 602 can instead pre-fill the gender field and simply ask the user to confirm the value, thereby creating a better survey experience.

Creating AI-driven visual representations and backgrounds from the resume of an applicant—using input data such as {text-based resume, LinkedIn™ profile data, social media accounts (Facebook™, Twitter™), Google™ search results} and location data extracted from the applicant's resume, the system 100 can create a response email to an employment application that has an AI-created wallpaper or background to foster an Inclusive and inviting template for the response email. The same or additional backgrounds created using the same inputs can be used by a recruiter making a video call to a potential recruit that causes the meeting members to be more comfortable and engaged in the call.

Creating AI-driven visual representations and backgrounds for the onboarding experience of new associates—using input data such as {text-based resume, LinkedIn™ profile data, social media accounts (Facebook™, Twitter™), Google™ search results}, location data extracted from the employee's resume, and other features such as job description the person was hired for and location the person will be based, the system 100 can create a myriad of onboarding experiences to emphasize an Inclusive and Diverse environment for the new associate, including but not limited to: suggested video conference backgrounds, suggested Affinity Groups, suggested days to come into the office to meet other likeminded people (this is based on including scheduling data of the new associate and other associates in the input data, etc.).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS™, Microsoft® Azure™, IBM® Cloud™).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more specialized processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for generating customized, context-specific visual artifacts using artificial intelligence (AI), the system comprising a computing device having a memory that stores computer-executable instructions and a processor that executes the computer-executable instructions to:
capture input data from one or more remote computing devices, the input data associated with one or more users;
create, using a generative AI-based visual artifact generator, one or more visual artifacts based upon the input data, each of the one or more visual artifacts uniquely representing the input data associated with one of the users; and
integrate each of the visual artifacts into a communication session associated with the one or more remote computing by combining the visual artifacts into a shared visual artifact that is representative of interactions between the one or more users during the communication session and layering the shared visual artifact into a video camera feed associated with each user, wherein combining comprises:
aggregating the input data captured from each of the remote computing devices into a single input dataset,
converting the single input dataset into a textual description, and
providing the textual description as part of an input prompt to the generative AI-based visual artifact generator to create a new synthetically-created generative AI image, and
storing the new synthetically-created generative AI image as the shared visual artifact.

2. The system of claim 1, wherein the input data comprises one or more of: text data input by the user, user demographic data, user profile data, user account data, health data, activity data, social media data, location data, employment profile data, diversity and inclusion data, time-stamp data, user preferences, hardware/software attributes associated with the remote computing device, video data captured from the remote computing device, audio data captured from the remote computing device, and characteristics of the communication session.

3. The system of claim 2, wherein at least a portion of the input data is captured from the remote computing devices while the communication session is ongoing between the one or more remote computing devices.

4. The system of claim 2, wherein the computing device analyzes the video data from the remote computing device to generate additional input data that comprises one or more attributes associated with a user depicted in the video data or a physical object depicted in the video data.

5. The system of claim 2, wherein the computing device analyzes the audio data from the remote computing device to generate additional input data comprising one or more attributes of a user's voice captured in the audio data.

6. The system of claim 1, wherein the computing device converts the input data into a format for ingestion by the generative AI-based visual artifact generator.

7. The system of claim 6, wherein converting the input data into a format for ingestion by the generative AI-based visual artifact generator comprises determining a label associated with the input data and assigning the label to the input data.

8. The system of claim 1, wherein each of the visual artifacts is representative of one or more characteristics of the input data for the associated user.

9. The system of claim 8, wherein the visual artifacts comprise synthetically-created generative AI images depicting one or more characteristics of the input data.

10. The system of claim 9, wherein the generative AI-based visual artifact generator comprises one or more of a generative adversarial network or a variational autoencoder.

11. The system of claim 1, wherein the communication session comprises a video conferencing session.

12. The system of claim 11, wherein integrating the visual artifacts into the communication session comprises layering the visual artifact associated with a user into a virtual background of a video feed depicting the user and transmitting the user's layered video feed to all other participants in the communication session.

13. The system of claim 1, wherein the computing device receives feedback relating to the visual artifacts from the users at one or more remote computing devices and modifies the input data based upon the user feedback prior to creating additional visual artifacts using the generative AI-based visual artifact generator.

14. The system of claim 1, wherein the computing device dynamically changes one or more of the visual artifacts generated during the communication session using the generative AI-based visual artifact generator based upon one or more updates to the input data associated with one or more users that is captured during the communication session.

15. A computerized method of generating customized, context-specific visual artifacts using artificial intelligence (AI), the method comprising:
capturing, by a computing device, input data from one or more remote computing devices, the input data associated with one or more users;
creating, by the computing device using a generative AI-based visual artifact generator, one or more visual artifacts based upon the input data, each of the one or more visual artifacts uniquely representing the input data associated with one of the users; and
integrating, by the computing device, each of the visual artifacts into a communication session associated with the one or more remote computing devices by combining the visual artifacts into a shared visual artifact that is representative of interactions between the one or more users during the communication session and layering the shared visual artifact into a video camera feed associated with each user, wherein combining comprises:
aggregating the input data captured from each of the remote computing devices into a single input dataset,
converting the single input dataset into a textual description, and
providing the textual description as part of an input prompt to the generative AI-based visual artifact generator to create a new synthetically-created generative AI image, and
storing the new synthetically-created generative AI image as the shared visual artifact.

16. The method of claim 15, wherein the input data comprises one or more of: text data input by the user, user demographic data, user profile data, user account data, health data, activity data, social media data, location data, employment profile data, diversity and inclusion data, timestamp data, user preferences, hardware/software attributes associated with the remote computing device, video data captured from the remote computing device, audio data captured from the remote computing device, and characteristics of the communication session.

17. The method of claim 16, wherein at least a portion of the input data is captured from the remote computing devices while the communication session is ongoing between the one or more remote computing devices.

18. The method of claim 16, wherein the computing device analyzes the video data from the remote computing device to generate additional input data that comprises one or more attributes associated with a user depicted in the video data or a physical object depicted in the video data.

19. The method of claim 16, wherein the computing device analyzes the audio data from the remote computing device to generate additional input data comprising one or more attributes of a user's voice captured in the audio data.

20. The method of claim 15, wherein the computing device converts the input data into a format for ingestion by the generative AI-based visual artifact generator.

21. The method of claim 20, wherein converting the input data into a format for ingestion by the generative AI-based visual artifact generator comprises determining a label associated with the input data and assigning the label to the input data.

22. The method of claim 15, wherein each of the visual artifacts is representative of one or more characteristics of the input data for the associated user.

23. The method of claim 22, wherein the visual artifacts comprise synthetically-created generative AI images depicting one or more characteristics of the input data.

24. The method of claim 23, wherein the generative AI-based visual artifact generator comprises one or more of a generative adversarial network or a variational autoencoder.

25. The method of claim 15, wherein the communication session comprises a video conferencing session.

26. The method of claim 25, wherein integrating the visual artifacts into the communication session comprises layering the visual artifact associated with a user into a virtual background of a video feed depicting the user and transmitting the user's layered video feed to all other participants in the communication session.

27. The method of claim 15, wherein the computing device receives feedback relating to the visual artifacts from the users at one or more remote computing devices and modifies the input data based upon the user feedback prior to creating additional visual artifacts using the generative AI-based visual artifact generator.

28. The method of claim 15, wherein the computing device dynamically changes one or more of the visual artifacts generated during the communication session using the generative AI-based visual artifact generator based upon one or more updates to the input data associated with one or more users that is captured during the communication session.

* * * * *